United States Patent
Kojima et al.

(10) Patent No.: US 8,763,640 B2
(45) Date of Patent: Jul. 1, 2014

(54) ROTARY VALVE

(75) Inventors: Makoto Kojima, Osaka (JP); Noriyuki Okuda, Osaka (JP); Takayuki Setoguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 85 days.

(21) Appl. No.: 13/499,247

(22) PCT Filed: Jul. 15, 2010

(86) PCT No.: PCT/JP2010/004612
§ 371 (c)(1),
(2), (4) Date: Mar. 29, 2012

(87) PCT Pub. No.: WO2011/039918
PCT Pub. Date: Apr. 7, 2011

(65) Prior Publication Data
US 2012/0180890 A1   Jul. 19, 2012

(30) Foreign Application Priority Data

Sep. 30, 2009  (JP) ................. 2009-226803

(51) Int. Cl.
*F16K 11/074* (2006.01)
*F16J 15/32* (2006.01)

(52) U.S. Cl.
USPC ............ 137/625.43; 137/625.23; 251/317.01; 277/589

(58) Field of Classification Search
CPC . F25B 41/046; F16K 11/0743; F16K 11/074; F16K 39/045; F16K 3/04; F16K 11/025
USPC ............. 137/625.21, 625.23, 625.43, 625.46, 137/625.47, 250; 251/283, 317.01; 277/589
See application file for complete search history.

(56) References Cited

U.S. PATENT DOCUMENTS 2,852,040 A * 9/1958 Deardorff ................. 137/625.21
3,014,499 A * 12/1961 Barksdale ................. 137/625.23
3,556,151 A * 1/1971 Masuda ..................... 137/625.21
(Continued)

FOREIGN PATENT DOCUMENTS

JP           38-18762 U    9/1963
JP           47-9344 B1    3/1972
(Continued)

OTHER PUBLICATIONS

International Search Report, PCT/JP2010/004612, Aug. 10, 2010.

*Primary Examiner* — Stephen M Hepperle
*Assistant Examiner* — Frederick D Soski
(74) *Attorney, Agent, or Firm* — Birch, Stewart, Kolasch & Birch, LLP

(57) ABSTRACT

A movable valve element is provided so as to rotate about a predetermined shaft center. A first valve seat and a second valve seat are respectively arranged apart from the movable valve element with predetermined clearances on both sides of the movable valve element in a direction along the shaft center. A first sealing member is arranged around a communication path so as to seal a space inside the communication path from a space defined by the clearance on a side close to the first valve seat. A second sealing member is arranged around the communication path so as to seal the space inside the communication path from a space defined by the clearance on a side close to the second valve seat.

6 Claims, 5 Drawing Sheets

(56) References Cited

U.S. PATENT DOCUMENTS

| | | | | |
|---|---|---|---|---|
| 4,964,433 | A | * | 10/1990 | Marietta .................. 137/115.04 |
| 5,014,748 | A | * | 5/1991 | Nogami et al. .......... 137/625.65 |
| 5,690,144 | A | * | 11/1997 | Takahashi ................ 137/625.43 |
| 5,787,930 | A | * | 8/1998 | Toyama ................... 137/625.43 |
| 5,911,242 | A | * | 6/1999 | Parker ...................... 137/625.43 |

FOREIGN PATENT DOCUMENTS

| | | |
|---|---|---|
| JP | 49-134802 U | 1/1974 |
| JP | 52-38736 U | 3/1977 |
| JP | 52-79330 A | 7/1977 |
| JP | 10-205923 A | 8/1998 |
| JP | 2002-005543 A | 1/2002 |

* cited by examiner

ROTARY VALVE

TECHNICAL FIELD

The present invention relates to a rotary valve for controlling a communication state among a plurality of connection ports by rotatably driving a movable valve element in which a communication path is formed.

BACKGROUND ART

In an air conditioner (refrigerating apparatus) in which refrigerant (e.g., carbon dioxide) circulates to perform a vapor compression refrigeration cycle in a refrigerant circuit, a four-way valve is provided to switch an operation state between a cooling operation and a heating operation. As one example of the four-way valve, there is a rotary valve for controlling a communication state among a plurality of connection ports by a movable valve element in which a communication path is formed (see, e.g., Patent Document 1).

In the rotary valve disclosed in Patent Document 1, a valve element (bowl-shaped element) for the four-way valve is rotatably attached to an inner bottom surface of a case. Three ports are provided at the bottom of the case, and another port is provided in a side wall of the case. By rotating the valve element, two of the three ports provided at the bottom of the case selectively communicate with each other, and the other port provided at the bottom of the case and the port provided in the side wall of the case communicate with each other through a space inside the case.

CITATION LIST

Patent Document

PATENT DOCUMENT 1: Japanese Patent Publication No. 2002-005543

SUMMARY OF THE INVENTION

Technical Problem

However, in the example disclosed in Patent Document 1, since a high-pressure port of a compressor is connected to the port provided in the side wall of the case, the space inside the case may be under pressure higher than pressure in a space inside the valve element (bowl-shaped element). The valve element is pressed against the bottom surface of the case due to differential pressure between the foregoing spaces, and torque for driving the valve element is increased due to friction resistance. Considering the foregoing, e.g., the size of a motor for rotatably driving the valve element may be increased, but it is not preferred because it results in an increase in cost and size of a valve. Alternatively, a mechanism for canceling the differential pressure upon driving of the valve element may be provided, but it cannot be employed in the rotary valve required to be driven while the differential pressure is maintained.

The present invention has been made in view of the foregoing, and it is an objective of the present invention to reduce drive torque of a rotary valve.

Solution to The Problem

In order to solve the foregoing problem, a first aspect of the invention is directed to a rotary valve in which a movable valve element (20) where a communication path (21) is formed rotates about a predetermined shaft center (M) and, thereby, a communication state among a plurality of connection ports (C, D, E, S) is controlled through the communication path (21) includes a first valve seat (10) opposing the movable valve element (20) on one side of the movable valve element (20) in a direction along the shaft center (M), the plurality of connection ports (C, D, E, S) being formed in the first valve seat (10); a second valve seat (30) opposing the movable valve element (20) on a side opposite to the first valve seat (10); and first and second sealing members (40, 41). Each of the first and second valve seats (10, 30) is arranged apart from the movable valve element (20) with a predetermined clearance. The communication path (21) penetrates the movable valve element (20) in the direction along the shaft center (M). The first sealing member (40) is arranged around the communication path (21) so as to seal a space inside the communication path (21) from a space defined by the clearance on a side close to the first valve seat (10), and the second sealing member (41) is arranged around the communication path (21) so as to seal the space inside the communication path (21) from the space defined by the clearance on a side close to the second valve seat (30).

In the foregoing configuration, when the pressure of a space outside the through-hole (21) is higher than that of the space inside the communication path (21), force corresponding to differential pressure between such spaces acts on each of the first and second sealing members (40, 41). A direction of such force is a direction in which the sealing member (40, 41) is substantially inwardly pressed (pressed toward the center of the communication path (21)). In addition, force in the direction along the shaft center (M) also acts on the movable valve element (20) due to pressing force of the first and second pressing members (42, 43) and elasticity of the sealing members (40, 41) themselves. That is, in the rotary valve, only force (contact force) generated by closely contacting the first or second sealing member (40, 41) to the valve seat (10, 30) acts. The contact force is smaller than force when a movable valve element is pressed against a valve seat due to differential pressure in a conventional rotary valve.

A second aspect of the invention is directed to the rotary valve of the first aspect of the invention, in which the movable valve element (20) includes a first pressing member (42) made of an elastic body and pressing the first sealing member (40) toward the first valve seat (10), and a second pressing member (43) made of an elastic body and pressing the second sealing member (41) toward the second valve seat (30).

According to the foregoing configuration, the sealing member (40, 41) is pressed against the valve seat (10, 30) by the first or second pressing member (42, 43) with predetermined force.

A third aspect of the invention is directed to the rotary valve of the second aspect of the invention, in which first and second grooves (22, 23) respectively accommodating the first and second sealing members (40, 41) are formed in the movable valve element (20), and the first and second pressing members (42, 43) are respectively accommodated in the first and second grooves (22, 23).

In the foregoing configuration, since the sealing member (40, 41) and the pressing member (42, 43) are accommodated in the groove (22, 23), it is ensured that the sealing member (40, 41) and the pressing member (42, 43) are held upon driving of the movable valve element (20).

A fourth aspect of the invention is directed to the rotary valve of the first aspect of the invention, in which the clearance is set to 0.5 mm.

In the foregoing configuration, even if the sealing member (40, 41) is deformed, the clearance between the movable valve element (20) and the valve seat (10, 30) is ensured.

A fifth aspect of the invention is directed to the rotary valve of the first aspect of the invention further including a hermetic container (50) accommodating the movable valve element (20) and the first and second valve seats (10, 30). First to fourth connection ports (S, C, E, D) are formed in the first valve seat (10) as the connection ports (C, D, E, S). The first to third connection ports (C, E, S) are arranged on an identical virtual circle defined on the first valve seat (10). The fourth connection port (D) is provided on the virtual circle of the first valve seat (10) or is provided so as to open to a space inside the hermetic container (50). The communication path (21) moves so as to be on the first and third connection ports (E, S) or on the first and second connection ports (C, S) in association with rotation of the movable valve element (20), and the connection ports on which the communication path (21) is positioned communicate with each other. The movable valve element (20) is formed so as to have a fan shape as viewed in plane, and overlaps only the first and third connection ports (E, S) of the four connection ports (S, C, E, D) in a state in which the first and third connection ports (E, S) communicate with each other through the communication path (21) or overlaps only the first and second connection ports (C, S) in a state in which the first and second connection ports (C, S) communicate with each other through the communication path (21).

In the foregoing configuration, the rotary valve can be switched between a state in which the first and third connection ports (E, S) communicate with each other and the second and fourth connection ports (C, D) communicate with each other, and a state in which the first and second connection ports (C, S) communicate with each other and the third and fourth connection ports (D, E) communicate with each other. That is, the rotary valve functions as a four-way valve for controlling the communication state among the four ports, i.e., the first to fourth connection ports (S, C, E, D).

A sixth aspect of the invention is directed to the rotary valve of the first aspect of the invention, in which part of the first sealing member (40) passing above the connection ports (C, D, E, S) when the movable valve element (20) rotates is wider than the other part of the first sealing member (40).

In the foregoing configuration, the wide part of the first sealing member (40) has a sufficient width to ensure durability, and an area where the first sealing member (40) and the first valve seat (10) contact each other can be reduced in the other part of the first sealing member (40).

A seventh aspect of the invention is directed to the rotary valve of the first aspect of the invention, in which the second sealing member (41) has a coefficient of friction smaller than that of the first sealing member (40).

In the foregoing configuration, since the coefficient of friction of the second sealing member (41) is smaller than that of the first sealing member (40), sliding resistance between the second sealing member (41) and the second valve seat (30) is reduced.

Advantages of the Invention

According to the first aspect of the invention, only the force (contact force) generated by closely contacting the first or second sealing member (40, 41) to the valve seat (10, 30) acts on the movable valve element (20). The contact force is smaller than the force when the movable valve element is pressed against the valve seat due to the differential pressure in the conventional rotary valve. Thus, according to the present invention, the rotary valve can be driven with smaller drive torque. If the drive torque can be reduced, the size of a drive mechanism such as a motor for driving the rotary valve is not necessarily increased, and therefore a cost can be reduced.

According to the second aspect of the invention, since the sealing member (40, 41) is pressed against the valve seat (10, 30) by the first or second pressing member (42, 43) with predetermined force, it can be further ensured that sealing performance is obtained.

According to the third aspect of the invention, since it is ensured that the sealing members (40, 41) and the pressing members (42, 43) are held upon the driving of the movable valve element (20), the sealing performance can be further improved. In addition, attachment of the sealing members (40, 41) and the pressing members (42, 43) can be further facilitated.

According to the fourth aspect of the invention, since the clearance between the movable valve element (20) and the valve seat (10, 30) is ensured, it can be ensured that the drive torque is reduced.

According to the fifth aspect of the invention, the four-way valve for which the drive torque is reduced can be configured.

According to the sixth aspect of the invention, both of reduction in drive torque and improvement of the durability can be realized.

According to the seventh aspect of the invention, since the sliding resistance between the second sealing member (41) and the second valve seat (30) is reduced, the drive torque can be reduced.

BRIEF DESCRIPTION OF THE DRAWINGS

FIG. 1 is a longitudinal sectional view schematically illustrating a configuration of a four-way valve of an embodiment.

FIGS. 2(A) and 2(B) are plan views each illustrating a configuration of a first valve seat and a movable valve element.

FIG. 3 is an enlarged view of a sealed part of the four-way valve illustrated in FIG. 1.

FIG. 4 is a plan view illustrating a configuration of a movable valve element and a first sealing member of a second embodiment of the present invention.

FIG. 5 is a view illustrating a state of the first sealing member when the first sealing member passes above a connection port.

FIG. 6 is a graph illustrating a relationship between an area where the first sealing member and a first valve seat contact each other and drive torque.

DESCRIPTION OF EMBODIMENTS

Embodiments of the present invention will be described below with reference to drawings. Note that the embodiments described below are set forth merely for purposes of preferred examples in nature, and are not intended to limit the scope, applications, and use of the invention.

<<First Embodiment of the Invention>>

<Summary>

Figure 1:
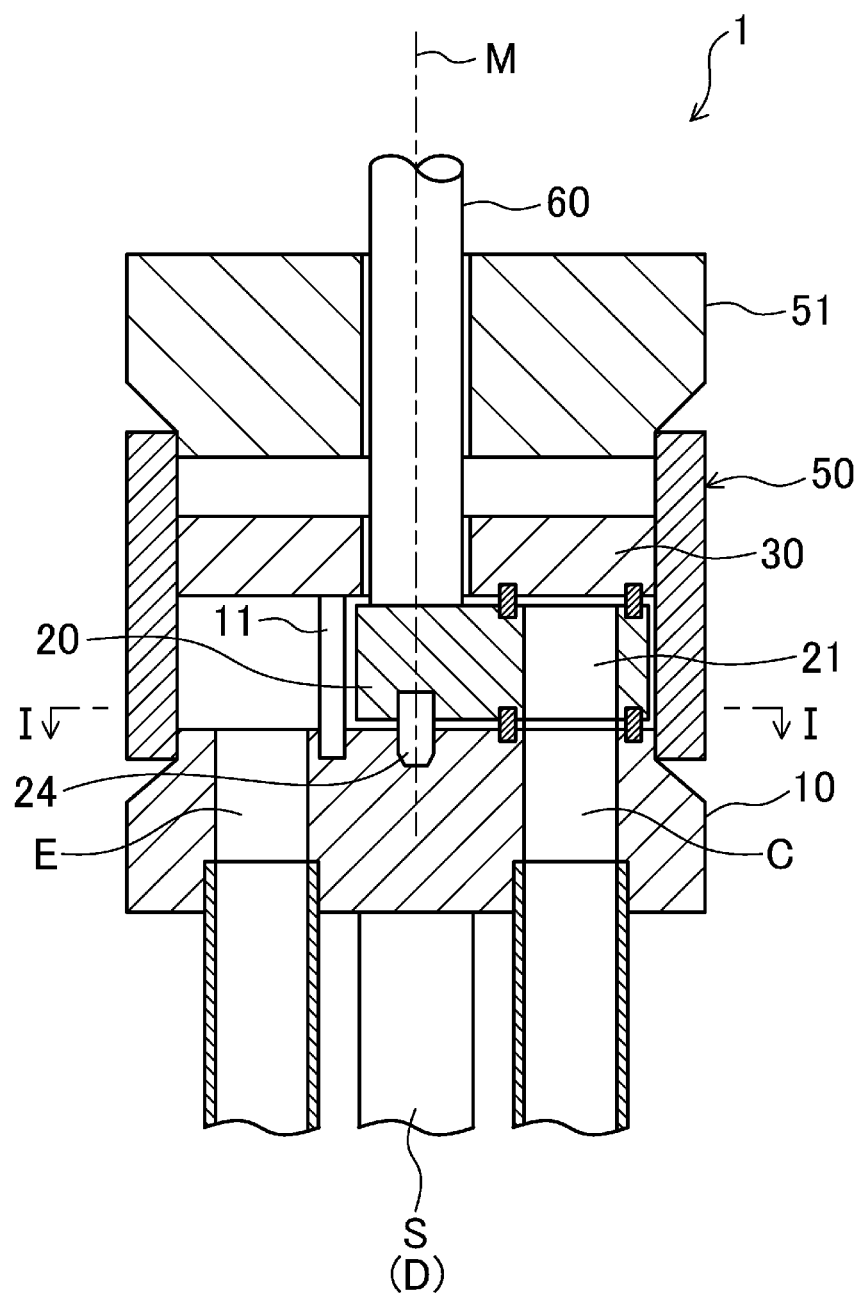
[FIG. 1]

As a first embodiment of the present invention, an example of a rotary four-way valve (rotary valve) will be described. The four-way valve is used for, e.g., an air conditioner (refrigerating apparatus) in which refrigerant (e.g., carbon dioxide) circulates to perform a vapor compression refrigeration cycle in a refrigerant circuit, and is used when switching an operation state of the air conditioner between a cooling operation and a heating operation. FIG. 1 is a longitudinal sectional view schematically illustrating a configuration of a four-way valve (1) of the present embodiment. Four connection ports (C, D, E, S) each connected to a pipe are formed in the four-way valve (1). The four-way valve (1) switches between two communication states, i.e., between a first communication state in which the connection ports (C, D) communicate with each other and the connection ports (E, S) communicate with each other, and a second communication state in which the connection ports (D, E) communicate with each other and the connection ports (C, S) communicate with each other. Note that the connection port (S), the connection port (C), the connection port (E), and the connection port (D) are described as first to fourth connection ports of the present invention, respectively.

The configuration of the four-way valve (1) will be described below. Note that a control of the communication state means a control by switching a connection among the connection ports in the four-way valve (1) of the present embodiment. However, other than the foregoing, the control of the communication state in the present invention includes various controls such as a control by switching a valve between two states which are an open state and a closed state and a control by continuously changing a flow rate of fluid.

<<Configuration of Four-Way Valve (1)>>

As illustrated in FIG. 1, the four-way valve (1) includes a movable valve element (20), first and second valve seats (10, 30), first and second sealing members (40, 41), and first and second pressing members (42, 43). The foregoing components are accommodated in a casing (50). The casing (50) is a hermetic dome-shaped pressure container.

<First Valve Seat (10)>

Figure 2:
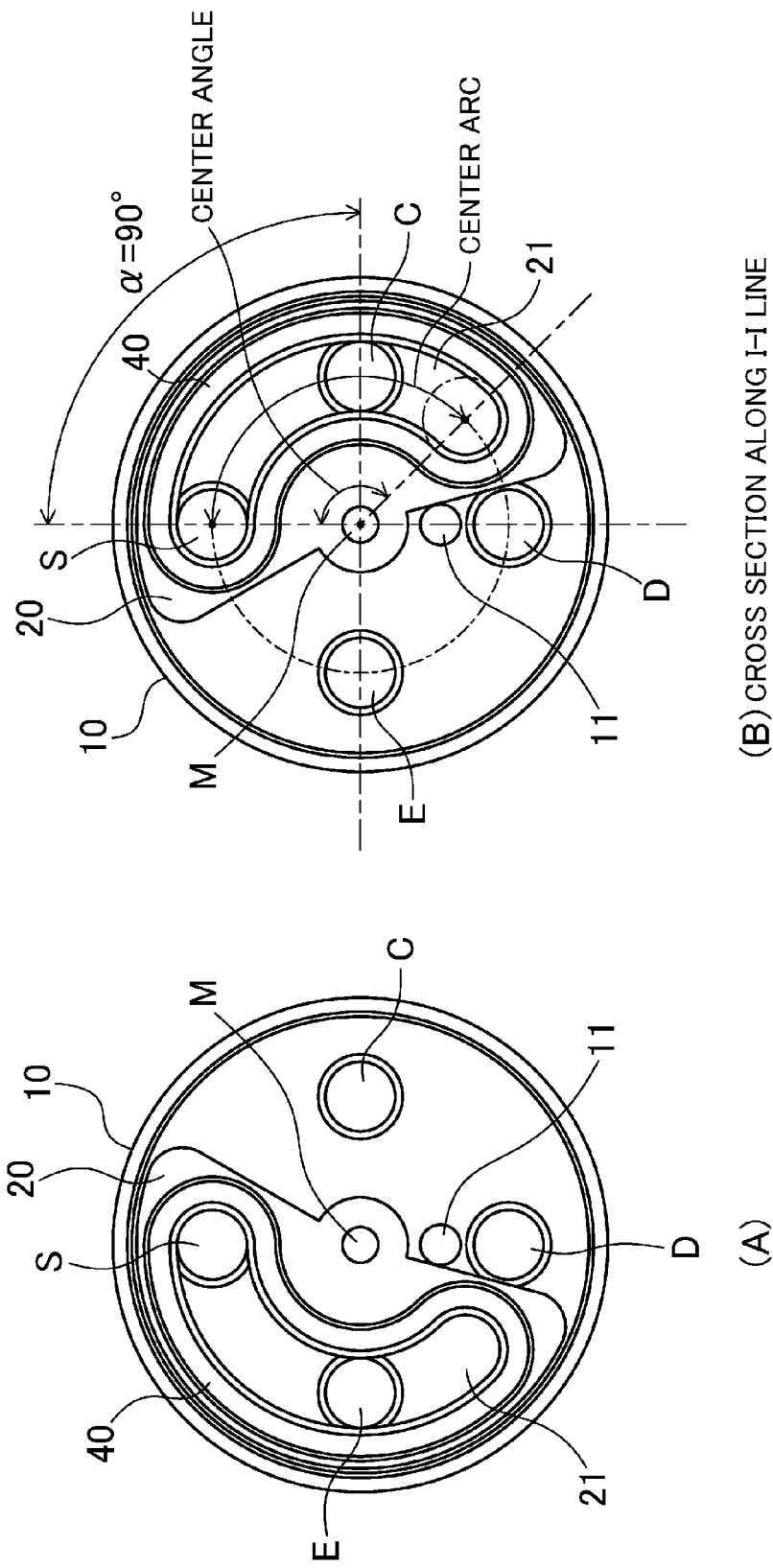
[FIG. 2]

FIG. 2 is a plan view illustrating a configuration of the first valve seat (10) and the movable valve element (20). The first valve seat (10) is in a discoid shape and is fixed to the casing (50). In the present example, the first valve seat (10) also serves as a lid on a bottom side of the casing (50) (see FIG. 1).

As illustrated in FIG. 2, the four connection ports (C, D, E, S) for the four-way valve (1) are formed in the first valve seat (10). The pipe is connected to each of the connection ports (C, D, E, S). The connection ports (C, D, E, S) are circular holes having the same diameter, and are arranged near an outer circumferential edge of the first valve seat (10). Specifically, the connection ports (C, D, E, S) are arranged at predetermined angular intervals (α) such that hole centers of the connection ports (C, D, E, S) are positioned on the same virtual circle. In the present example, α=90°.

<Movable Valve Element (20)>

The movable valve element (20) has a fan shape as viewed in the plane (a substantially semicircular planar shape in the present example) and is arranged on an upper surface of the first valve seat (10) (on an upper side of the first valve seat (10) as viewed in FIG. 1). A drive shaft (60) of a motor (not shown in the figure) is attached to the movable valve element (20), and the movable valve element (20) is rotatably driven about a shaft center (M) of the drive shaft (60). That is, the movable valve element (20) is displaced in a rotation direction relative to the first valve seat (10). A pin (24) for rotatably supporting the movable valve element (20) is provided on a lower side of the movable valve element (20). In addition, a pin-like stopper (11) is provided in the first valve seat (10) and restricts the position of the movable valve element (20) in the rotation direction within a predetermined area.

A through-hole (communication path) (21) is formed in the movable valve element (20). The through-hole (21) is used for switching the communication state among the predetermined connection ports (C, D, E, S) of the first valve seat (10). For example, FIG. 2(A) illustrates a state in which the through-hole (21) is positioned on the connection ports (E, S) and the connection ports (E, S) communicate with each other, and FIG. 2(B) illustrates a state in which the through-hole (21) is positioned on the connection ports (C, S) and the connection ports (C, S) communicate with each other. In the state in which the connection ports (C, S) communicate with each other, the movable valve element (20) overlaps only the connection ports (C, S) and does not overlap the connection ports (D, E). This allows the connection ports (D, E) to open to a space inside the casing (50), and therefore the connection ports (D, E) communicate with each other through the space inside the casing (50) (see FIG. 2(B)). That is, the state illustrated in FIG. 2(B) corresponds to the second communication state of the four-way valve (1).

When the movable valve element (20) rotates counter-clockwise from the foregoing state and then the through-hole (21) moves to be on the connection ports (E, S), the connection ports (E, S) communicate with each other. In the state in which the connection ports (E, S) communicate with each other, the movable valve element (20) overlaps only the connection ports (E, S) and does not overlap the connection ports (C, D) as illustrated in FIG. 2(A). This allows the connection ports (C, D) to open to the space inside the casing (50), and therefore the connection ports (C, D) communicate with each other through the space inside the casing (50). That is, such a state corresponds to the first communication state.

In order to perform the switching, the shape etc. of the through-hole (21) are determined as follows. That is, in the present example, the through-hole (21) is an arc-shaped through-hole having a uniform thickness as viewed in plane. In addition, the through-hole (21) is configured such that an arc (hereinafter referred to as a "center arc" and see FIG. 2) passing through the middle of the through-hole (21) in a width direction thereof has the same curvature as that of the virtual circle (described above) with reference to which the positions of the connection ports (C, D, E, S) are determined, and that the arc is defined so as to be concentric to the virtual circle. The width of the through-hole (21) is set so as to be the same as the diameter of the connection port (C, D, E, S) or to be slightly larger than the diameter of the connection port (C, D, E, S).

As long as the length of the center arc of the through-hole (21), i.e., the center angle of the center arc, is determined with reference to the angular interval (α) (90° in the present example) of the connection ports (E, S) for which the communication is controlled, the communication state among the connection ports can be switched between the first and second communication states. In the four-way valve (1), the center angle of the center arc of the through-hole (21) is larger than the angular interval (α) (see FIG. 2). The example illustrated in FIG. 2(A) (example in the second communication state) is a state in which the movable valve element (20) rotates counter-clockwise at its maximum, and the movable valve element (20) contacts the stopper (11). In such a state, the through-hole (21) contacts the connection port (S) at one end thereof.

<Second Valve Seat (30)>

The second valve seat (30) is in a discoid shape and is fixed to the casing (50) (see FIG. 1). A bearing (not shown in the figure) is fitted into a center part of the second valve seat (30), and the drive shaft (60) of the motor is fitted into the bearing. The drive shaft (60) penetrates a lid (51) provided on an upper side of the casing (50) and is connected to the motor. Note that it is necessary that the space inside the casing (50) does not communicate with an outside of the casing (50), and therefore, e.g., a seal may be provided between the drive shaft (60) and the lid (51) or the motor itself may be accommodated in the casing (50).

<Arrangement of Movable Valve Element (20) and First and Second Valve Seats (10, 30)>

In the four-way valve (1), each of the first and second valve seats (10, 30) is arranged apart from the movable valve element (20) with a predetermined clearance. In the present example, the clearance is formed between a lower surface of the movable valve element (20) and the first valve seat (10) by the pin (24). In the present embodiment, the clearance is set to 0.5 mm. In such a manner, even if the sealing member (40, 41) is deformed, the clearance between the movable valve element (20) and the valve seat (10, 30) is ensured.

<Sealing in Movable Valve Element (20)>

Figure 3:
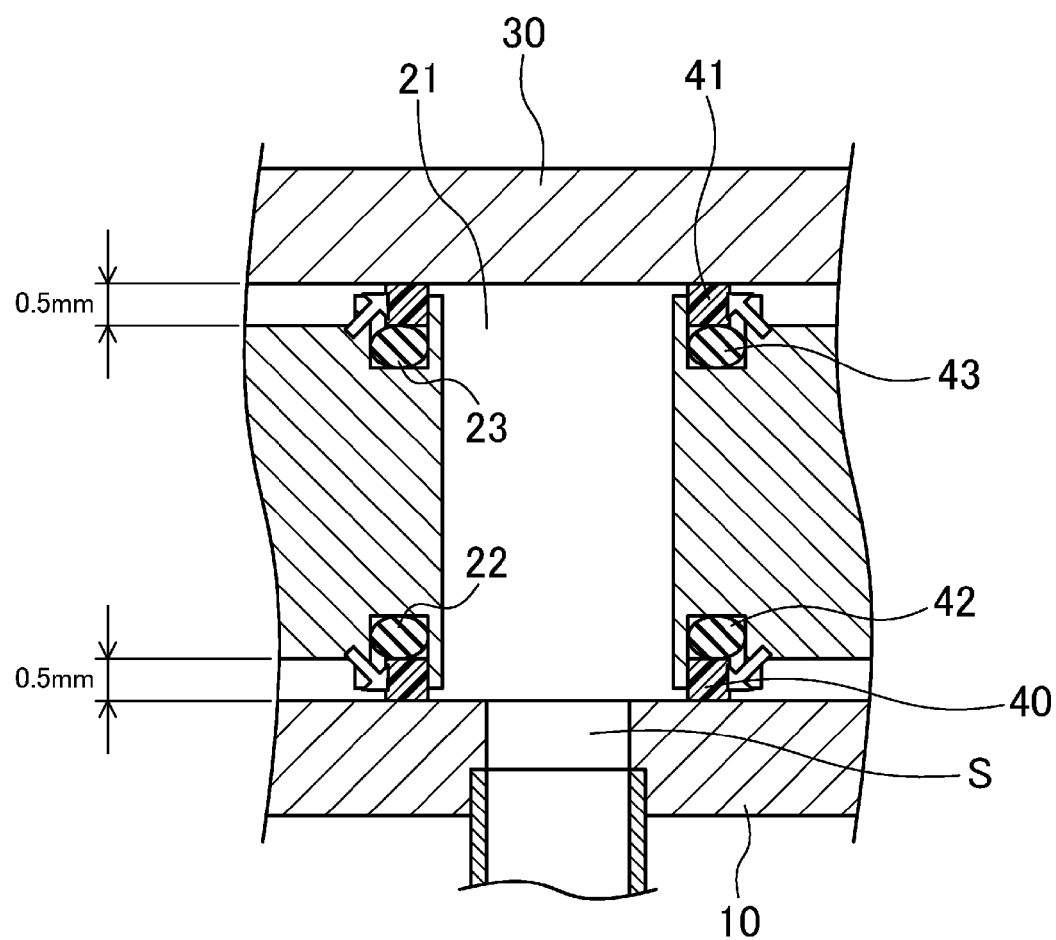
[FIG. 3]

In the four-way valve (1), the first sealing member (40) is arranged around the through-hole (21) so as to seal a space inside the through-hole (21) from the clearance on a side close to the first valve seat (10), and the second sealing member (41) is arranged around the through-hole (21) so as to seal the space inside the through-hole (21) from the clearance on a side close to the second valve seat (30) (see FIG. 2). FIG. 3 is an enlarged view of a sealed part of the four-way valve (1) illustrated in FIG. 1. As illustrated in FIG. 3, first and second grooves (22, 23) each having a square cross section are formed in the lower surface and an upper surface of the movable valve element (20), respectively. The first and second sealing members (40, 41) are fitted into the first and second grooves (22, 23), respectively. In the present example, each of the first and second sealing members (40, 41) has a square cross section. In addition, in the present example, packing made of polytetrafluoroethylene (PTFE) is employed as the first and second sealing members (40, 41). Note that the PTFE packing has been set forth as an example, and the material of the packing may be selected as necessary depending on use conditions (e.g., the pressure of fluid and physical properties of fluid) etc. For example, poly phenylene sulfide (PPS) or polyetheretherketone (PEEK) may be employed.

The four-way valve (1) further includes the first pressing member (42) made of an elastic body and pressing the first sealing member (40) toward the first valve seat (10), and the second pressing member (43) made of an elastic body and pressing the second sealing member (41) toward the second valve seat (30). In the present example, the first pressing member (42) is fitted into the first groove (22) so as to be on a bottom surface of the first groove (22), and the first sealing member (40) is fitted into the first groove (22) so as to be on an outer side relative to the first pressing member (42) (on a lower side relative to the first pressing member (42) as viewed in FIG. 3). Similarly, the second pressing member (43) is fitted into the second groove (23) so as to be on a bottom surface of the second groove (23), and the second sealing member (41) is fitted into the second groove (23) so as to be on an outer side relative to the second pressing member (43) (on an upper side relative to the second pressing member (43) as viewed in FIG. 3). In the present example, a so-called "O-ring" is employed as the first and second pressing members (42, 43). Note that the O-ring has been set forth as an example, and various members functioning as an elastic body, such as disc springs, may be employed.

<<Drive Torque of Four-Way Valve (1)>>

In the four-way valve (1) of the present embodiment, when the pressure of the space inside the casing (50) is higher than that of the space inside the through-hole (21), force corresponding to the differential pressure between such spaces acts on each of the first and second sealing members (40, 41). A direction of such force is a direction in which the sealing member (40, 41) is substantially inwardly pressed (pressed toward the center of the through-hole (21)). In addition, force in a direction along the shaft center (M) also acts on the movable valve element (20) due to pressing force of the first and second pressing members (42, 43) and elasticity of the sealing members (40, 41) themselves. Resultant force thereof substantially acts in directions indicated by arrows in FIG. 3. That is, in the four-way valve (1), only force (contact force) generated by closely contacting the packing (first and second sealing members (40, 41)) to the valve seat (10, 30) acts. The contact force is smaller than force when a movable valve element is pressed against a valve seat due to differential pressure in a conventional rotary valve.

<<Advantages of the Present Embodiment>>

As described above, according to the present embodiment, the four-way valve (rotary valve) (1) can be driven by smaller drive torque. If the drive torque can be reduced, the size of the motor is not necessarily increased, and therefore a cost can be reduced.

In addition, a special mechanism such as a mechanism for canceling the differential pressure upon driving of the rotary valve is not necessarily provided.

In the four-way valve (1), the clearance between the movable valve element (20) and the valve seat (10, 30) is set to 0.5 mm, thereby ensuring the clearance between the movable valve element (20) and the valve seat (10, 30) even if the sealing member (40, 41) is deformed. Thus, it can be ensured that the drive torque is reduced.

<<Second Embodiment of the Invention>>

Figure 4:
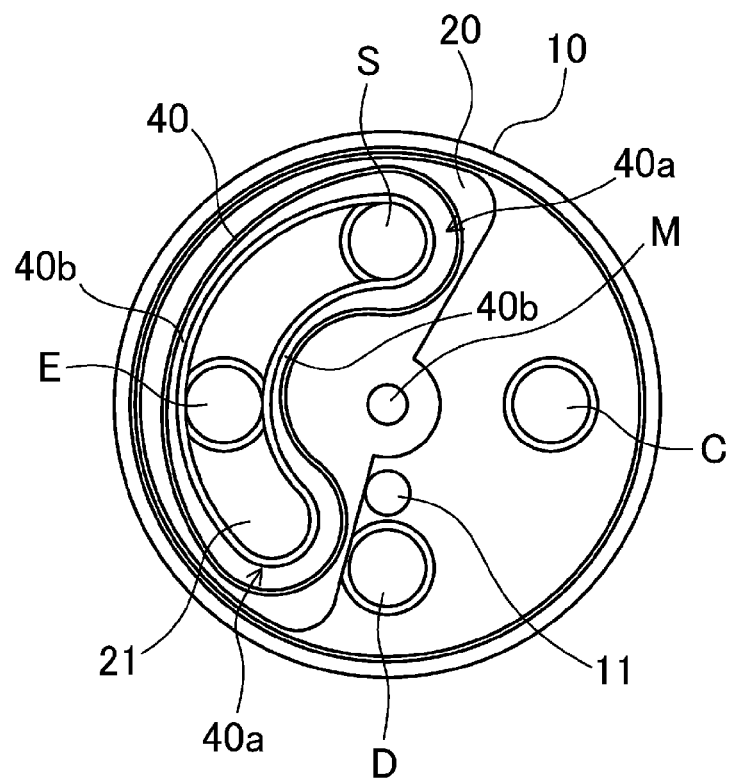
[FIG. 4]

FIG. 4 is a plan view illustrating a configuration of a movable valve element (20) and a first sealing member (40) of a second embodiment of the present invention. In the present embodiment, the sealing member to be positioned on connection ports (C, D, E, S), i.e., the first sealing member (40), is configured such that part of the first sealing member (40) passing above the connection ports (C, D, E, S) when the movable valve element (20) rotates has wide parts (40a) of the first sealing member (40) wider than the other part of the first sealing member (40) as illustrated in FIG. 4. The specific width of the wide part (40a) is determined considering durability of the first sealing member (40). In the second embodiment, the width of the wide part (40a) is the same as that of a corresponding part of the first sealing member (40) of the first embodiment. In addition, part (hereinafter referred to as a narrow part (40b)) of the first sealing member (40) which does not pass above the connection ports (C, D, E, S) when the movable valve element (20) rotates is narrower than a corresponding part of the first sealing member (40) of the first embodiment. Note that the wide part (40a) may be formed only in the part of the first sealing member (40) passing above the connection ports (C, D, E, S) considering the durability, but the wide part (40a) and the narrow part (40b) are connected together so as to define a gentle slope because a width increase only in the part of the first sealing member (40) passing above the connection ports (C, D, E, S) results in a sharp increase in width at an interface between the wide part (40a) and the narrow part (40b). Thus, in the present example, there is a slightly-wide part of the first sealing member (40) even in part of the first sealing member (40) which does not influence the durability.

In the present embodiment, a second sealing member (41) is made of a material having a smaller coefficient of friction than that of the first sealing member (40). Specifically, in the present embodiment, PPS is employed for the first sealing member (40), and PTFE (e.g., Teflon (registered trademark)) having a smaller coefficient of friction than that of PPS is employed for the second sealing member (41).

<<Advantages of the Present Embodiment>>

Figure 5:
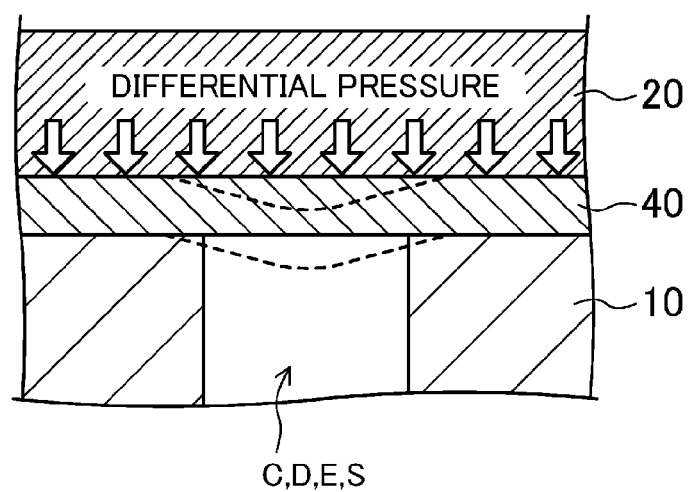
[FIG. 5]

When the movable valve element (20) rotates and the first sealing member (40) passes above the connection ports (C, D, E, S), if the pressure of a space inside a casing (50) is higher than that of a space inside a through-hole (21), part of the first sealing member (40) corresponding to the connection ports (C, D, E, S) warps due to differential pressure between the foregoing spaces. FIG. 5 is a view illustrating a state of the first sealing member (40) when the first sealing member (40) passes above the connection port (C, D, E, S), and a deformed shape of the first sealing member (40) is indicated by a dashed line in FIG. 5. When such deformation is caused, if the first sealing member (40) does not have the sufficient durability, there is a possibility that sealing performance is degraded or the first sealing member (40) is easily broken. In this regard, since the first sealing member (40) of the present embodiment is configured such that the part of the first sealing member (40) passing above the connection ports (C, D, E, S) when the movable valve element (20) rotates is wider than the other part of the first sealing member (40), sufficient stiffness of such a wide part can be ensured. By ensuring the sufficient stiffness as described above, the warpage of the first sealing member (40) when the differential pressure acts is reduced, and, as a result, the durability can be ensured in the present embodiment. Note that, since PPS used as the material of the first sealing member (40) has hardness greater than that of Teflon (registered trademark) used for the second sealing member (41), durability performance of the first sealing member (40) is further improved.

Figure 6:
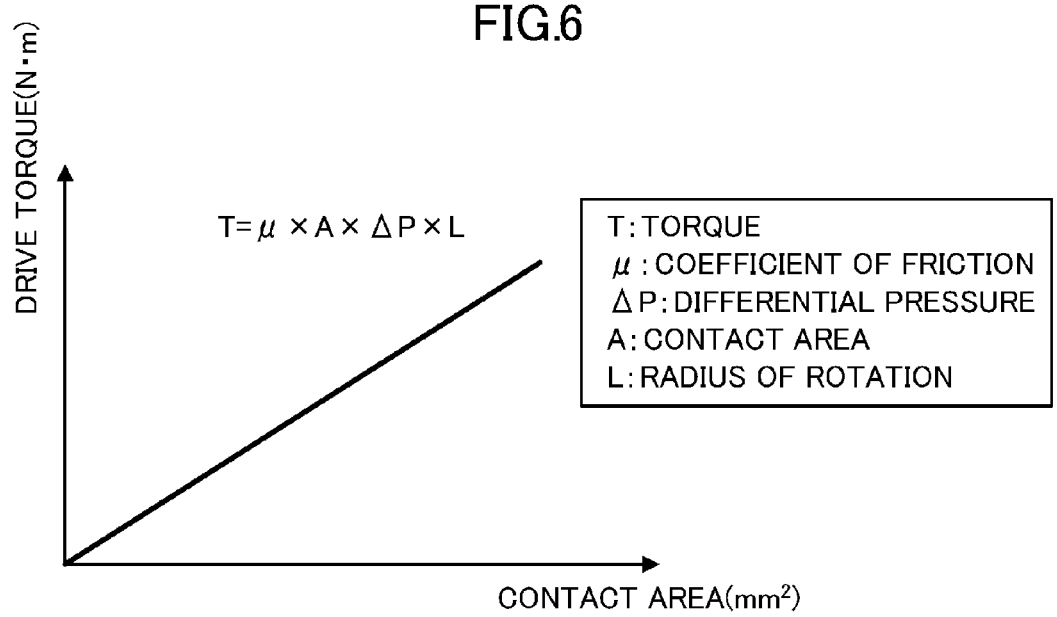
[FIG. 6]

In theory, drive torque of the movable valve element (20) is proportional to an area where the sealing member (40, 41) and a seat valve (10, 30) contact each other as illustrated in FIG. 6. Thus, if the width of the first sealing member (40) is increased as described above in order to ensure or improve the durability, the drive torque of the movable valve element (20) may be increased. However, in the present embodiment, the part of the first sealing member (40) which does not pass above the connection ports (C, D, E, S) when the movable valve element (20) rotates is narrower than the part of the first sealing member (40) passing above the connection ports (C, D, E, S). Thus, in the present embodiment, the area where the first sealing member (40) and the first valve seat (10) contact each other can be reduced. In samples made by the inventors, the contact area is about 423 mm$^2$ in the first embodiment, whereas the contact area can be reduced to about 305 mm$^2$ in the second embodiment. When the drive torque was measured for the samples, the drive torque of the movable valve element (20) of the present embodiment could be reduced by about 18% as compared to that of the first embodiment.

As described above, according to the present embodiment, both the reduction in drive torque and the improvement of the durability can be realized.

In the present embodiment, since the coefficient of friction of the second sealing member (41) is smaller than that of the first sealing member (40), sliding resistance between the second sealing member (41) and the second valve seat (30) is reduced, and, as a result, the drive torque can be further reduced. Such material selection is allowed because the second sealing member (41) does not pass above the connection ports (C, D, E, S) as the first sealing member (40) does and the second sealing member (41) is advantageous in the durability as compared to the first sealing member (40).

<<Other Embodiment>>

Note that the foregoing four-way valves have been set forth as examples and the present invention can be applied to other types of valves. Specifically, the present invention may be applied to, e.g., an opening/closing valve for opening/closing communication between two connection ports or to a flow rate control valve (e.g., an expansion valve used in a refrigerant circuit) for continuously controlling a flow rate between two connection ports.

As in the second embodiment, the materials of the first and second sealing members (40, 41) may be determined in the first embodiment such that the coefficient of friction of the second sealing member (41) is smaller than that of the first sealing member (40).

Industrial Applicability

The present invention is useful as the rotary valve for controlling the communication state among the plurality of connection ports by rotatably driving the movable valve element in which the communication path is formed.

Description Of Reference Characters

1 Four-Way Valve (Rotary Valve)
10 First Valve Seat
20 Movable Valve Element
21 Through-Hole (Communication Path)
22 First Groove
23 Second Groove
30 Second Valve Seat
40 First Sealing Member
41 Second Sealing Member
42 First Pressing Member
43 Second Pressing Member
50 Casing (Hermetic Container)
C Connection Port
D Connection Port
E Connection Port
S Connection Port
M Shaft Center

The invention claimed is:

1. A rotary valve in which a movable valve element where a communication path is formed rotates about a predetermined shaft center and, thereby, a communication state among a plurality of connection ports is controlled through the communication path, comprising:
   a first valve seat opposing the movable valve element on one side of the movable valve element in a direction along the shaft center, the plurality of connection ports being formed in the first valve seat;
   a second valve seat opposing the movable valve element on a side opposite to the first valve seat; and
   first and second sealing members,
   wherein each of the first and second valve seats is arranged apart from the movable valve element with a predetermined clearance,
   the communication path penetrates the movable valve element in a direction parallel to a longitudinal axis of the shaft center,
   the first sealing member is arranged around the communication path so as to seal a space inside the communication path from a space defined by the clearance on a side close to the first valve seat, and the second sealing member is arranged around the communication path so as to seal the space inside the communication path from the space defined by the clearance on a side close to the second valve seat, and
   part of the first sealing member passing above the connection ports when the movable valve element rotates is wider in a direction parallel to a sealing surface than another part of the first sealing member.

2. The rotary valve of claim 1, wherein the movable valve element includes a first pressing member made of an elastic body and pressing the first sealing member toward the first valve seat, and a second pressing member made of an elastic body and pressing the second sealing member toward the second valve seat.

3. The rotary valve of claim 2, wherein first and second grooves respectively accommodating the first and second sealing members are formed in the movable valve element, and the first and second pressing members are respectively accommodated in the first and second grooves.

4. The rotary valve of claim 1, wherein the clearance is set to 0.5 mm

5. A rotary valve in which a movable valve element where a communication path is formed rotates about a predetermined shaft center and, thereby, a communication state among a plurality of connection ports is controlled through the communication path, comprising:

a first valve seat opposing the movable valve element on one side of the movable valve element in a direction along the shaft center, the plurality of connection ports being formed in the first valve seat;

a second valve seat opposing the movable valve element on a side opposite to the first valve seat;

first and second sealing members; and a hermetic container accommodating the movable valve element and the first and second valve seats, wherein each of the first and second valve seats is arranged apart from the movable valve element with a predetermined clearance, the communication path penetrates the movable valve element in a direction parallel to a longitudinal axis of the shaft center, the first sealing member is arranged around the communication path so as to seal a space inside the communication path from a space defined by the clearance on a side close to the first valve seat, and the second sealing member is arranged around the communication path so as to seal the space inside the communication path from the space defined by the clearance on a side close to the second valve seat, first, second, and third connection ports are formed in the first valve seat as the connection ports, the first, second, and third connection ports are arranged on an identical virtual circle defined on the first valve seat, a fourth connection port is formed in the first valve seat so as to be provided on the virtual circle of the first valve seat, or provided so as to open to a space inside the hermetic container, the communication path moves so as to be on the first and third connection ports or on the first and second connection ports in association with rotation of the movable valve element, and the connection ports on which the communication path is positioned communicate with each other, and the movable valve element is formed so as to have a fan shape as viewed in plane, and overlaps only the first and third connection ports of the four connection ports in a state in which the first and third connection ports communicate with each other through the communication path or overlaps only the first and second connection ports in a state in which the first and second connection ports communicate with each other through the communication path.

6. The rotary valve in which a movable valve element where a communication path is formed rotates about a predetermined shaft center and, thereby, a communication state among a plurality of connection ports is controlled through the communication path, comprising:

a first valve seat opposing the movable valve element on one side of the movable valve element in a direction along the shaft center, the plurality of connection ports being formed in the first valve seat;

a second valve seat opposing the movable valve element on a side opposite to the first valve seat; and first and second sealing members, wherein each of the first and second valve seats is arranged apart from the movable valve element with a predetermined clearance, the communication path penetrates the movable valve element in a direction parallel to a longitudinal axis of the shaft center, the first sealing member is arranged around the communication path so as to seal a space inside the communication path from a space defined by the clearance on a side close to the first valve seat, and the second sealing member is arranged around the communication path so as to seal the space inside the communication path from the space defined by the clearance on a side close to the second valve seat, and the second sealing member has a coefficient of friction smaller than that of the first sealing member.

* * * * *